(12) United States Patent
Tan et al.

(10) Patent No.: US 10,318,077 B2
(45) Date of Patent: Jun. 11, 2019

(54) COHERENT ILLUMINATION FOR TOUCH POINT IDENTIFICATION

(71) Applicant: Hewlett-Packard Development Company, L.P., Houston, TX (US)

(72) Inventors: Kar-Han Tan, Sunnyvale, CA (US); David Bradley Short, San Diego, CA (US); Jinman Kang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 119 days.

(21) Appl. No.: 15/508,385

(22) PCT Filed: Sep. 5, 2014

(86) PCT No.: PCT/US2014/054302
§ 371 (c)(1),
(2) Date: Mar. 2, 2017

(87) PCT Pub. No.: WO2016/036385
PCT Pub. Date: Mar. 10, 2016

(65) Prior Publication Data
US 2017/0285873 A1    Oct. 5, 2017

(51) Int. Cl.
*G06K 9/00* (2006.01)
*G06K 9/20* (2006.01)
(Continued)

(52) U.S. Cl.
CPC .......... *G06F 3/0425* (2013.01); *G06F 3/0421* (2013.01); *G06K 9/00355* (2013.01);
(Continued)

(58) Field of Classification Search
CPC .................. G06F 3/0425; G06K 9/00355
See application file for complete search history.

(56) References Cited

U.S. PATENT DOCUMENTS 7,015,401 B2    3/2006  Yeh
7,161,582 B2    1/2007  Bathiche et al.
(Continued)

FOREIGN PATENT DOCUMENTS

KR    10-2012-0135184 A    12/2012
TW         201430668 A     8/2014

OTHER PUBLICATIONS

M Vannoni et al, "Speckle Interferometry Experiments with a Digital Photocamera," Am. J. Phys. 72(7), Jul. 2004, pp. 906-909.
(Continued)

*Primary Examiner* — Kevin M Nguyen
(74) *Attorney, Agent, or Firm* — HP Inc. Patent Department (57) ABSTRACT

A system includes a sensor to capture multiple images of a portion of a first object illuminated by coherent illumination and a time of capture of each of the images; and a processor to compare two images of the multiple images to identify one or more touch points. Each touch point has a difference in value between the two images that is greater than a threshold. Upon determining a spatial shape formed by the identified touch points that corresponds to a pointing end of a pointing object, the system provides at least one of: i) a touch location of the pointing end relative to the first object, where the touch location is based on the spatial shape formed by the identified touch points, or ii) the time of capture of a second image of the two images that produced the spatial shape.

15 Claims, 10 Drawing Sheets

(51) Int. Cl.
*G06K 9/62* (2006.01)
*G06T 7/20* (2017.01)
*G06F 3/042* (2006.01)
*G06T 7/246* (2017.01)

(52) U.S. Cl.
CPC ......... *G06K 9/2036* (2013.01); *G06K 9/6201* (2013.01); *G06T 7/20* (2013.01); *G06T 7/248* (2017.01); *G06T 2207/10141* (2013.01); *G06T 2207/30196* (2013.01)

(56) References Cited

U.S. PATENT DOCUMENTS

| | | | |
|---|---|---|---|
| 7,189,958 B2 | 3/2007 | Spillman et al. | |
| 7,427,981 B2 | 9/2008 | DePue et al. | |
| 7,599,561 B2 | 10/2009 | Wilson et al. | |
| 7,710,391 B2 | 5/2010 | Bell et al. | |
| 7,737,959 B2 | 6/2010 | Gruhlke et al. | |
| 8,121,640 B2 | 2/2012 | Russ et al. | |
| 8,199,117 B2 | 6/2012 | Izadi et al. | |
| 8,736,583 B2 | 5/2014 | Anderson et al. | |
| 2004/0021643 A1* | 2/2004 | Hoshino | G06F 3/016 345/173 |
| 2005/0078092 A1 | 4/2005 | Clapper | |
| 2008/0018591 A1 | 1/2008 | Pittel et al. | |
| 2011/0050650 A1* | 3/2011 | McGibney | G06F 3/0386 345/175 |
| 2011/0242054 A1 | 10/2011 | Tsu | |
| 2013/0077236 A1 | 3/2013 | Becze et al. | |
| 2013/0241887 A1 | 9/2013 | Sharma | |
| 2013/0342493 A1 | 12/2013 | Crow et al. | |
| 2014/0098058 A1 | 4/2014 | Baharav et al. | |
| 2014/0132761 A1 | 5/2014 | Shih et al. | |
| 2014/0232695 A1 | 8/2014 | McGaughan et al. | |

OTHER PUBLICATIONS

Shahram Izadi et al., "C-Slate: A Multi-Touch and Object Recognition System for Remote Collaboration using Horizontal Surfaces," 2007, pp. 3-10, IEEE.

* cited by examiner

COHERENT ILLUMINATION FOR TOUCH POINT IDENTIFICATION

BACKGROUND

When a scene is illuminated with a coherent light source, a speckle pattern can be observed. A speckle pattern is a non-uniform intensity pattern produced by the mutual interference of wave fronts emitted by the coherent light source.

BRIEF DESCRIPTION OF THE DRAWINGS

The accompanying drawings illustrate various examples of the principles described below. The examples and drawings are illustrative rather than limiting.

DETAILED DESCRIPTION

A touch screen system, capable of identifying when a flat surface has been touched, employs cameras that are aligned such that their optical axes are parallel to they two-dimensional surface of the touch screen. However, when the object to be monitored is not flat, such as a toy, it is not feasible to use aligned cameras for touch detection, especially if the object is not known in advance. In some cases, microphones can be embedded in the object to estimate where a touch on the object occurred, but the use of microphones requires the geometry and material of the object to be known. Described below are techniques for detecting changes in a speckle pattern to identify where an object was touched and/or when the object was touched.

Figure 1A:
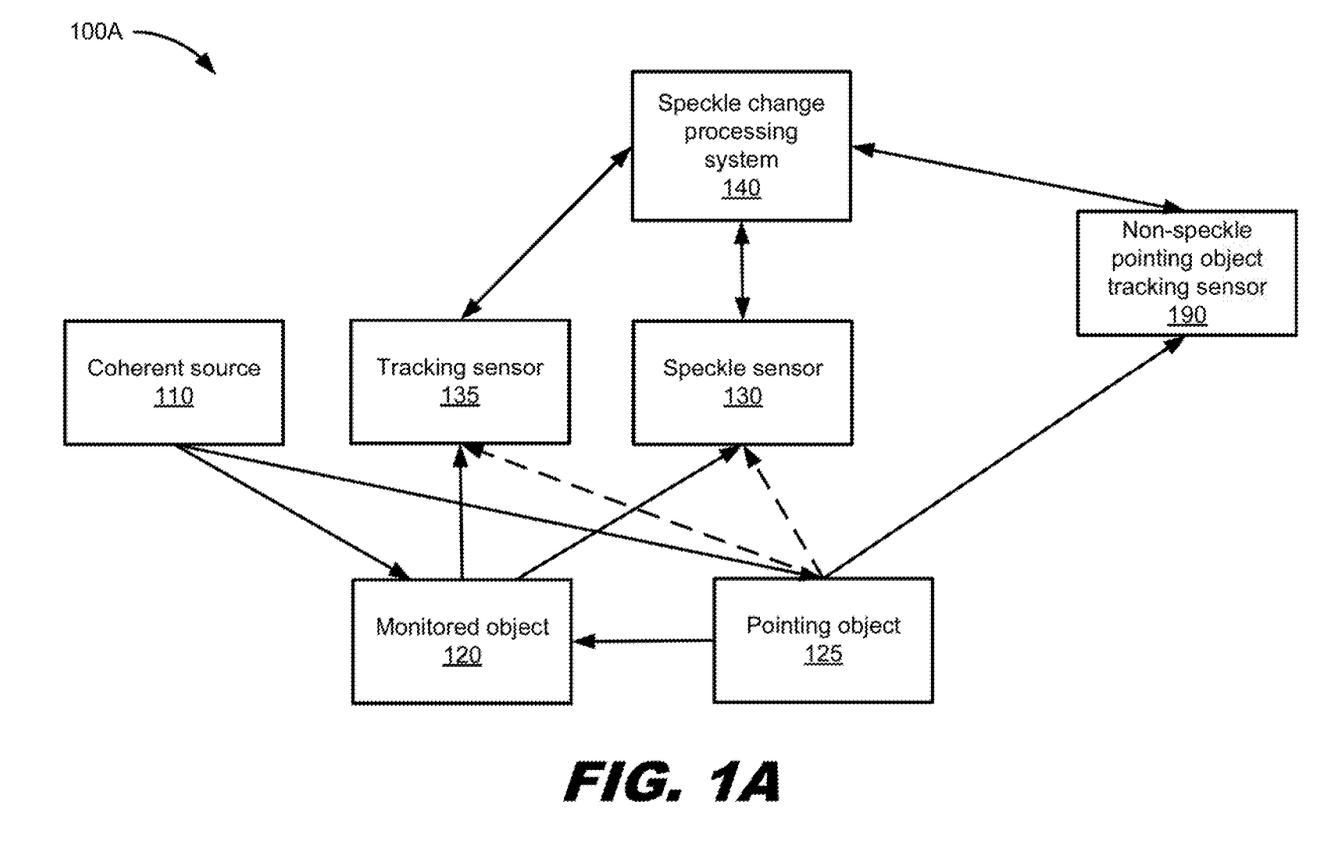
FIG. 1A depicts a block diagram of an example system including a speckle change processing system.

FIG. 1A depicts a block diagram of an example system 100A including a speckle change processing system 140 for detecting the location and/or time at which a monitored object or item 120 is touched by a pointing object 125. The object 120 to be monitored can be a two-dimensional flat surface, such as a touch mat, or even a three-dimensional object, such as a book. The pointing object 125 can be, for example, a user's finger or fingers or a stylus, where the pointing object 125 has one or more pointing ends for touching or making contact with the object 120.

A coherent source 110 generates coherent light to illuminate the object 120 to be monitored, or a portion of the object to be monitored, and can be, for example, a laser. Moreover, parts of the pointing object 125, including but not limited to, one or more of the pointing ends can also be illuminated by coherent light from the coherent source 110. Any wavelength illumination can be used, for example, infrared wavelengths. Light from the coherent source 110 can be spread using, for example, diverging optics, to illuminate the object 120. Alternatively, appropriate optics can be used to focus the light to a line or a spot and repeatedly scanned by a scanning mechanism to illuminate the object 120 and the pointing object 125, if present, in the field of view of a sensor, such as speckle sensor 130. Illumination of the object 120 and the pointing object 125 by the coherent source 110 generates a grainy speckle pattern that is detected by speckle sensor 130, and changes in the detected speckle pattern are analyzed by the speckle change processing system 140.

A speckle pattern is a light intensity pattern that is produced by the interference of waves emitted from a coherent source. In the system 100B in the example of FIG. 1B, the coherent source 110 generates coherent light waves having the same phase. One or more optics represented by the lens 115 may collimate the coherent light emitted by the coherent source 110 to illuminate an object 120. However, in some cases, the lens 115 is not be used; for example, other optics that act upon the coherent light or no optics at all can be used. The object 120 has a non-specular surface on which the coherent light impinges. Note that the coherent source 110 can illuminate the monitored object at any angle.

Coherent light waves generated with the same phase and traveling the same distance or traveling distances that differ by an integer multiple of the wavelength of the light will be in phase and interfere constructively. This case is shown by the representative light waves 150 in the example of FIG. 1B which are reflected from the non-specular surface of object 120 toward the speckle sensor 130. When constructively interfering light waves 150 impinge on the speckle sensor 130, a maximum light intensity is detected at point 150a. In contrast, coherent light waves generated with the same phase and traveling distances that differ by an odd integer multiple of half of the wavelength of the light will be out of phase and interfere destructively. This case is shown by the representative light waves 152 in the example of FIG. 1B which are also reflected from the surface of object 120 toward the speckle sensor 130. When the destructively interfering light waves 152 impinge on the speckle sensor 130, zero light intensity is detected at point 152a. Light waves having intermediate phase differences will have an intensity level between the maximum light intensity and zero.

Figure 1B:
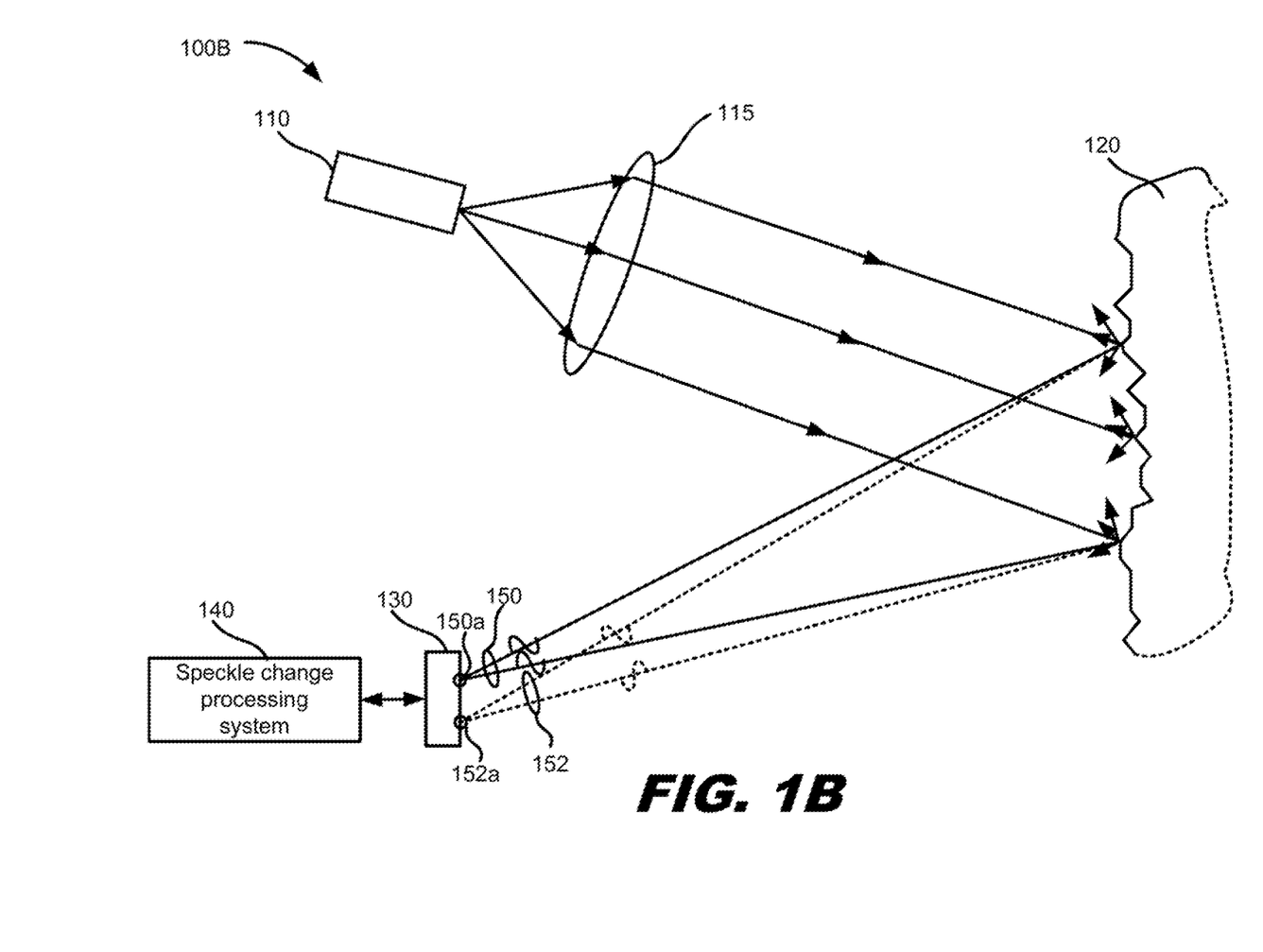
FIG. 1B depicts an example schematic diagram showing how speckle is produced by an optical system and subsequently captured by a sensor for processing by a speckle change processing system.

With a static system, such as system 100B, where the coherent source 110, lens 115, monitored object 120, and speckle sensor 130 are stationary, the speckle pattern detected by the speckle sensor 130 is also stationary. However, the speckle pattern can change when something in the system 100B changes. In fact, the speckle change processing system 140 can use the change in speckle pattern to identify changes in the system 100B. For example, if the monitored object 120 is touched by a pointing object 125 so that the surface of the monitored object 120 illuminated by the coherent light moves, the distance that the coherent light waves travel before reaching the speckle sensor 130 will also change, resulting in a speckle pattern change. The technique is sufficiently sensitive to detect a deflection of half the wavelength of light used for illumination. In the example of an infrared illumination source at 850 nm, a 425 nm deflection of the surface of the object 120 can be detected as a touch. The techniques presented below advantageously use the detection of changes in speckle pattern to determine where and/or when a monitored object has been touched.

The speckle sensor 130 can be any type of sensor, such as a CMOS (complementary metal-oxide-semiconductor) sensor or CCD (charge-coupled device) sensor, that is responsive to the wavelengths of the coherent light. The speckle sensor 130 captures images of the speckle pattern on the monitored object 120 and the pointing object 125 in its field of view, where the captured images can include the time of capture of the respective image. In some cases, the images are full images of the entire field of view. Two of the full images can be compared for speckle pattern changes. In some cases, each of the images captures a portion of the field of view, for example, a vertical slice of the field of view, and several of the images are used to generate a composite image of the entire field of view. Then composite images can be compared for speckle pattern changes.

In some implementations, the images captured by the speckle sensor 130 can be processed by the speckle change processing system 140 to identify movements of the surface of the monitored object 120 and/or the pointing end(s) of the pointing object 125. In some implementations, the images captured by the speckle sensor 130 can be processed by the speckle change processing system 140 to track and/or identify the pointing object 125. For example, if a speckle change pattern corresponds to the shape of the pointing object 125, the speckle change pattern can subsequently be used to track the pointing object 125. Tracking and identification information of the pointing object 125 can be used to narrow the region of interest of the speckle pattern changes in the images captured by the speckle sensor 130.

Returning to FIG. 1A, a tracking sensor 135, distinct from the speckle sensor 130, can be used to capture speckle pattern images of the pointing object 125 to be used by the speckle change processing system 140 to track movements of one or more pointing ends of the pointing object 125. The tracking sensor 135 should be responsive to the wavelengths of the coherent light.

Alternatively or additionally, a non-speckle pointing object tracking sensor 190 can be used to capture images of the pointing object 125 that are not speckle pattern images. For example, the non-speckle pointing object tracking sensor 190 can be any type of sensor that is responsive to wavelengths of non-coherent light that illuminate the pointing object 125, such as visible wavelengths present in the environment or emitted from a visible light source (not shown in FIG. 1A). Examples of a non-speckle pointing object tracking sensor 190 can include a depth camera and a red-green-blue (RGB) camera. The non-speckle object tracking sensor 190 captures images of the pointing object 125, and the speckle change processing system 140, or other external processor (not shown), can use, for example, computer vision techniques and algorithms to track and identify the pointing end(s) of the pointing object 125.

Figure 2:
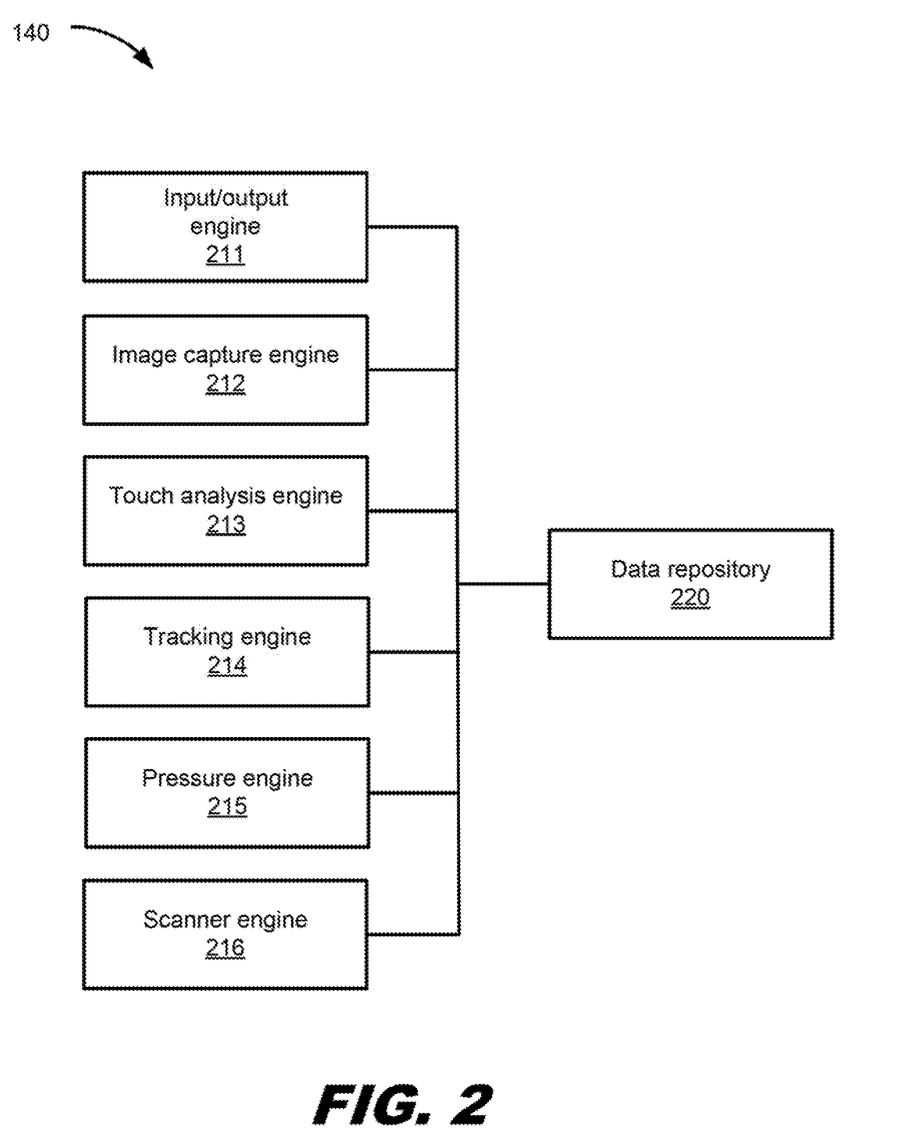
FIG. 2 depicts a block diagram of an example speckle change processing system.
Figure 3:
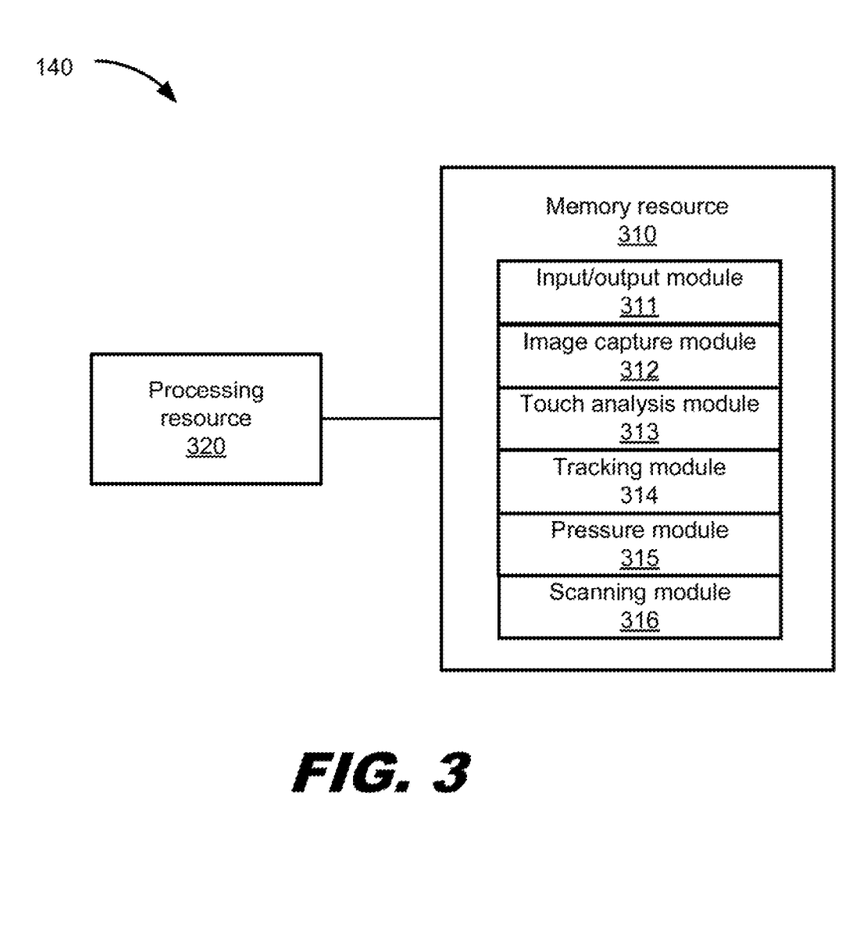
FIG. 3 depicts a block diagram of an example memory resource and example processing resource.

FIGS. 2 and 3 depict examples of physical and logical components for implementing the speckle change processing system 140. In the example of FIG. 2, various components are identified as engines 211, 212, 213, 214, 215, 216. The descriptions of engines 211, 212, 213, 214, 215, 216 will focus on each engine's designated function. However, the term engine refers to a combination of hardware and programming configured to perform a designated function. As illustrated with respect to FIG. 3, the hardware of each engine, for example, may include a processor and a memory, while the programming is software code stored on that memory and executable by the processor to perform the designated function.

FIG. 2 depicts a block diagram of the example speckle change processing system 140. Speckle change processing system 140 can include an input/output engine 211, an image capture engine 212, a touch analysis engine 213, a tracking engine 214, a pressure engine 215, and a scanner engine 216. Each of the engines 211, 212, 213, 214, 215, 216 can interact with the data repository 220. Additional or fewer engines can be included in the speckle change processing system 140 and each illustrated engine.

Input/output engine 211 may be configured to receive signals to trigger the capture of a speckle pattern with the speckle sensor 130 and/or the tracking sensor 135, or to receive a series of images of a monitored object 120, or a portion of the monitored object 120, and a pointing object 125, if present, in a field of view illuminated by coherent illumination, along with a time of capture of each of the images for analysis. The input/output engine 211 may receive images captured by the speckle sensor 130 and/or the tracking sensor 135 and/or the non-speckle pointing object tracking sensor 190. In some cases, the input/output engine 211 can receive tracking information for the pointing object 125 obtained from an external processor that processes images captured by the non-speckle pointing object tracking sensor 190.

Input/output engine 211 may also be configured to provide as an output 1) a touch location of a pointing end of a pointing object 125 relative to the monitored object 120, where the touch location is based on an identified spatial pattern of touch pixels, i.e., pixels in the image corresponding to a speckle pattern change greater than a threshold value, or 2) a time of capture of the images that produced the identified spatial pattern. In some cases, input/output engine 211 may provide as an output a first pressure and a second pressure of the pointing object 125 against the monitored object 120, or a notification that a change in pressure has occurred.

Image capture engine 212 is configured to use the speckle sensor 130 and/or the tracking sensor 135 to capture a plurality of images of an object of interest 120, or a portion of an object of interest, and a pointing object 125, if present, illuminated by coherent source 110. The image capture engine 212 can use a timing device, such as a clock, to identify the time of capture of each of the plurality of images. In some implementations, the coherent illumination is repeatedly scanned across the object 120, or portion of the object 120, by the scanner engine 216 (described below). In this case, the image capture engine 212 works in conjunction with the scanner engine 216 to ensure that the camera shutter exposure time for capturing each of the images is sufficiently long to capture an entire cycle of scanning over the field of view.

Touch analysis engine 213 is configured to compare two images of a plurality of images to identify one or more touch points, also referred to as touch pixels, in the images, where each touch point has a difference in value between the two images that is greater than a threshold value. The threshold value can be predetermined as a constant value, an algorithm for determining the threshold value can be used, or the threshold value can be determined adaptively. Thus, if the change in value for a particular pixel in the images is small so that it is less than the threshold value, that pixel is not identified as a touch point because the change could be due to noise in the system or a change in the environment unrelated to a touch made by the pointing object on the monitored object. In some implementations, tracking engine 214 (described below) tracks one or more pointing ends of a pointing object. In these cases, the touch analysis engine 213 can compare the regions in the two images near the one or more pointing ends to identify touch points, rather than the entire images. Further, the touch analysis engine 213 determines whether a spatial shape or pattern formed by touch points corresponds to a pointing end of a pointing object.

Tracking engine 214 is configured, in some implementations, to, identify and track one or more pointing ends of a pointing object 125 from the images captured by the image capture engine 212 using the speckle sensor 130. The pointing object ends can be one or more fingers of a user and/or a stylus. The tracking engine 214 can use speckle pattern changes corresponding to a shape of a pointing object to track and identify the pointing end(s) of the pointing object 125. For example, the pointing object 125 can be a hand. Because a user's hand is never completely stationary, speckle pattern changes observed in the images in the shape of a hand can be used to identify pointing ends of the hand to determine regions for the touch analysis engine 213 to compare pixels. These locations are passed to the touch analysis engine 213 to interrogate the pixels in the regions around the pointing end(s) used touch the object 120 that is being monitored to narrow the region of interest.

Alternatively or additionally, the tracking engine 214 is configured to use speckle pattern images from one or more tracking sensors 135, different from the speckle sensor 130, for tracking and identifying the pointing end(s) of the pointing object 125. Again, the tracking engine 214 can use speckle pattern changes corresponding to a shape of a pointing object to track and identify the pointing end(s) of the pointing object 125. The images captured by the tracking sensors 135 should be aligned to the images captured by the speckle sensor 130 so that a region of a tracked pointing end of a pointing object 125 can be correlated with changes in the speckle pattern in the images captured by the speckle sensor 130.

Alternatively or additionally, the tracking engine 214 is configured to identify and track one or more pointing ends from images captured by one or more non-speckle pointing object tracking sensors 190. The tracking engine 214 can use, for example, computer vision techniques and algorithms to identify the finger(s) and/or stylus and their locations for non-speckle pattern based images. In some cases, the tracking engine 214 can receive the tracked locations of the pointing end(s) of the pointing object 125 from an external source based on images captured by the non-speckle pointing object tracking sensor 190.

Pressure engine 215 is configured to compare pixels of a first pair of consecutive images of a series of images of an item illuminated by coherent illumination to identify touch pixels, where a difference in value of each touch pixel between the two images is greater than a threshold; and identify and store a first pattern of touch pixels that corresponds to a pointing end of a pointing object. The threshold can be predetermined as a fixed value, or can change adaptively. The pressure engine 215 performs another comparison of pixels of a second pair of images to identify and store a second pattern of touch pixels that corresponds to the pointing end of the pointing object.

The pressure engine 215 is also configured to associate the first pattern with a first pressure of the pointing object against the item, and upon determining a change in size of the second pattern from the first pattern, associate the second pattern with a second pressure of the pointing object against the item, where the second pressure is based on the change in size. For example, for the case of a semi-circle pattern associated with the first pressure of a finger on a flat surface, if the radius of the semi-circle pattern increases, then the second pressure of the finger on the flat surface has increased from the first pressure. A calibration of pressure as a function of spatial pattern dimensions for a given type of surface can be stored in a database for use in determining the pressure from the pattern size, and the first and second pressures or a qualitative difference between the first pressure and the second pressure can be provided as an output. Performing pressure estimation may be useful for a drawing application in which the line weight of the drawing changes depending on the applied pressure.

Alternatively or additionally, the pressure engine 215 can be configured to associate the first pattern with a touch of the pointing object against the item. Then upon determining a change in size of the second pattern in subsequent images of the series of images from the first pattern, where the change is greater than a given change, the pressure engine 215 associates the second pattern with a change in pressure of the pointing object against the item. The given change can be a constant value, or can be determined adaptively. The pressure engine 215 is also configured to provide as an output notification that a change in pressure has occurred. Thus, contact can be made with the item upon the touch, and a subsequent increase in pressure of the touch beyond a threshold triggers the identification of a change in pressure. This process may be useful for a musical keyboard application where the loudness produced when a key is touched by a user on the keyboard is based on the change in detected pressure.

In some implementations, scanner engine 216 is configured to illuminate the monitored object 120 by scanning light from the coherent source 110 over the object 120. In some cases, the light is scanned by repeatedly scanning the source or scan optics that illuminate the object across the object 120. For example, the output from the coherent source 110 can be spread into a line using a diffractive optics lens, and the scanner engine 216 can move a mechanical stage carrying the lens back and forth across the object to illuminate the entire field of view of the speckle sensor 130. In another example, the output from the coherent source 110 can be focused to a spot and scanned both horizontally and vertically over the object to illuminate the entire field of view of the speckle sensor 130.

Data repository 220 can store data, such as speckle patterns, speckle pattern changes, pressure levels, and spatial speckle patterns corresponding to pointing objects.

In the above description, various components were described as combinations of hardware and programming. Such components may be implemented in different ways. Referring to FIG. 3, the programming may be processor executable instructions stored on tangible memory resource 310 and the hardware may include processing resource 320 for executing those instructions. Thus, memory resource 310 can store program instructions that when executed by processing resource 320, implements the speckle change processing system 140 of FIG. 2.

Memory resource 310 generally represents any number of memory components capable of storing instructions that can be executed by processing resource 320. Memory resource 310 is non-transitory in the sense that it does not encompass a transitory signal but instead is made up of one or more memory components configured to store the relevant instructions. Memory resource 310 may be implemented in a single device or distributed across devices. Likewise, processing resource 320 represents any number of processors capable of executing instructions stored by memory resource 310. Processing resource 320 may be integrated in a single device or distributed across devices. Further, memory resource 310 may be fully or partially integrated in the same device as processing resource 320, or it may be separate but accessible to that device and processing resource 320.

In one example, the program instructions can be part of an installation package that when installed can be executed by processing resource 320 to implement speckle change processing system 140. In this case, memory resource 310 may be a portable medium such as a compact disc (CD), digital video disc (DVD), or flash drive or a memory maintained by a server from which the installation package can be downloaded and installed. In another example, the program instructions may be part of an application or applications already installed. Memory resource 310 can include integrated memory, such as a hard drive, solid state drive, or the like.

In the example of FIG. 3, the executable program instructions stored in memory resource 310 are depicted as input/output module 311, image capture module 312, touch analysis module 313, tracking module 314, pressure module 315, and scanning module 316. Input/output module 311 represents program instructions that when executed cause processing resource 320 to implement input/output engine 211. Image capture module 312 represents program instructions that when executed cause processing resource 320 to implement image capture engine 212. Touch analysis module 313 represents program instructions that when executed cause processing resource 320 to implement touch analysis engine 213. Tracking module 314 represents program instructions that when executed cause processing resource 320 to implement tracking engine 214. Pressure module 315 represents program instructions that when executed cause processing resource 320 to implement pressure engine 215. Scanning module 316 represents program instructions that when executed cause processing resource 320 to implement scanning engine 216.

Figure 4A:
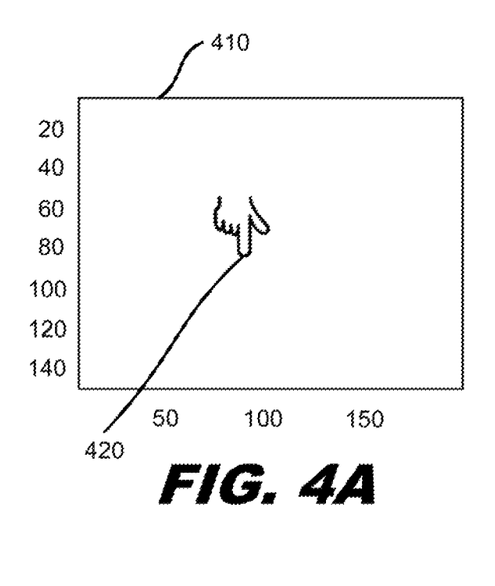
FIG. 4A depicts an image of a finger touching an example flat surface.

FIG. 4A is an image of a finger of a hand 420 touching or making contact with an example flat surface 410. The numbers on the vertical and horizontal axes of FIGS. 4A-4C correspond to the pixel number in the speckle sensor 130 that acquired the image. The reflection of coherent illumination from the hand 420 and flat surface 410 produces a speckle pattern at the speckle sensor 130. The speckle pattern in a first image captured at a time $T_1$ before the finger touches the surface 410 and in a second image captured at a time $T_2$ after the finger touches the surface 410 are compared. In an example implementation for detecting a speckle pattern change, a difference between the first image and the second image is calculated. The resulting difference image is processed such that pixels having an intensity change greater than a threshold value is shown in the example image of FIG. 4B as white, and the other pixels are shown as black.

Figure 4B:
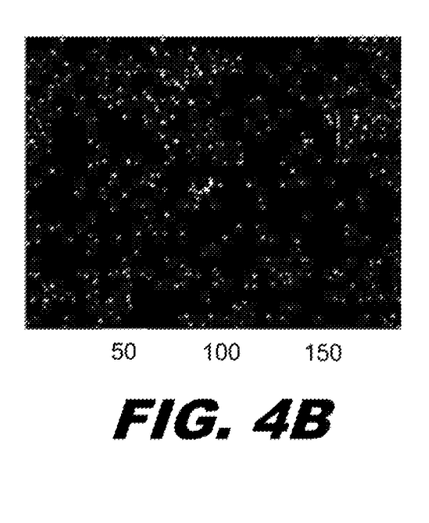
FIG. 4B shows an example image created based on identifying speckle changes greater than a threshold.

When the finger pushes down on the flat surface 410 and deflects the surface around the tip of the finger due to the pressure applied by the finger, the change in speckle pattern is visible as white dots forming a u-shaped semi-circle near the center of the image of FIG. 4B. The u-shaped semi-circle corresponds to the shape of the fingertip making contact with and pushing down on the flat surface 410. The other white dots in the example of FIG. 4B do not correspond to the shape of a pointing object, thus they can be ignored. The identification of a group of pixels changing together in the same manner is an indication that a pointing object has touched the object being monitored.

Figure 4C:
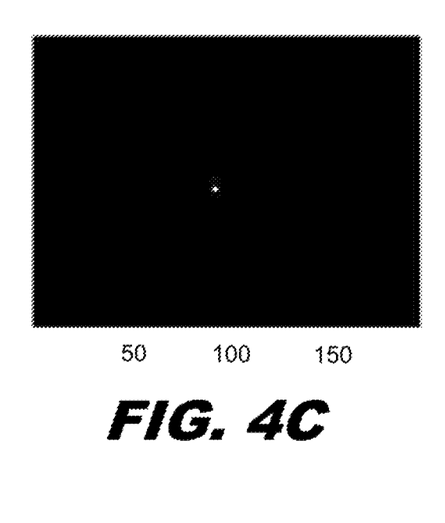
FIG. 4C shows a centroid of an identified example spatial pattern identified from FIG. 4B.

Finally, the white dot in the example image of FIG. 4C is obtained by calculating the centroid of the identified example u-shaped semi-circle pattern from FIG. 4B. The location of the centroid can be provided as an output for the location of the touch of the finger on the flat surface 410.

Figure 4D:
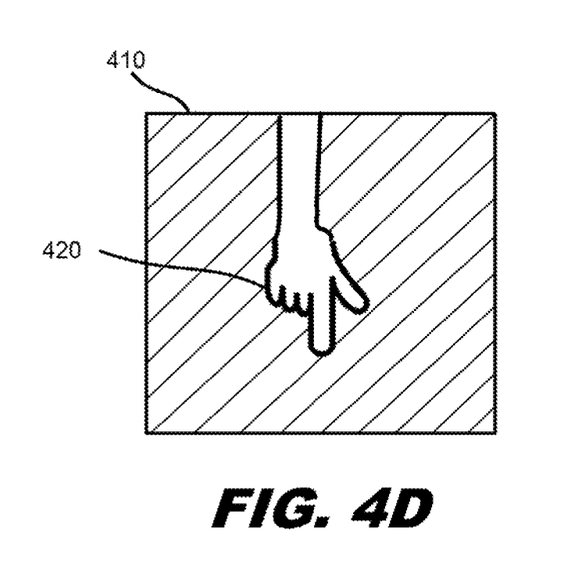
FIGS. 4D-4E show an example change in speckle pattern that results when a user's finger touches a touch mat.
Figure 4E:
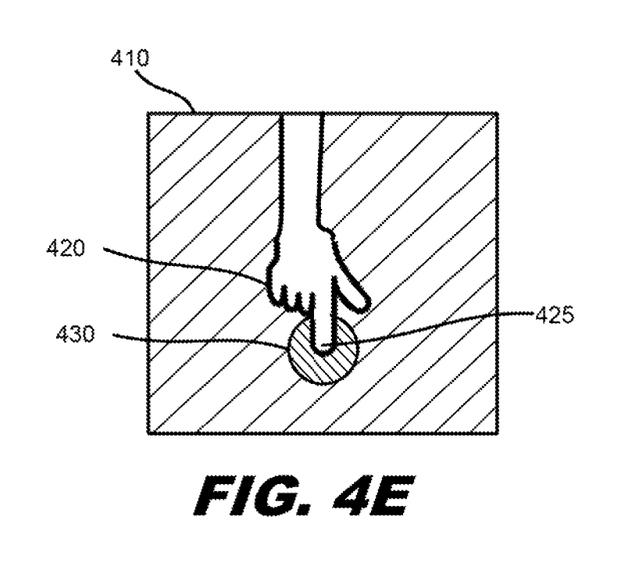

In the examples of FIGS. 4D-4E, a change in speckle pattern is illustrated when a user touches a touch mat 410 or a flexible horizontal surface. In FIG. 4D, captured at a time $t_1$, a user's hand 420 and arm is shown hovering over the touch mat 410. The user is not making contact with the touch mat 410. As a result, no speckle pattern change due to touch is visible.

At a subsequent time $t_2$ the user's finger 425 contacts the touch mat 410. A circular speckle pattern change 430, as shown in the example image of FIG. 4E, can be identified on the touch mat 410 in the region around the tip of the user's finger 425 contacting the touch mat 410. The diameter of the speckle change pattern 430 depends upon the flexibility of the surface 410—for a more flexible surface, the diameter of the speckle change pattern 430 is larger. The presence of the speckle change pattern at time $t_2$ signals that the user touched the touch mat 410 at time $t_2$. Moreover, the centroid of the circular speckle change pattern can be used as a determination of the location of the touch on the touch mat 410 at time $t_2$.

Figure 5:
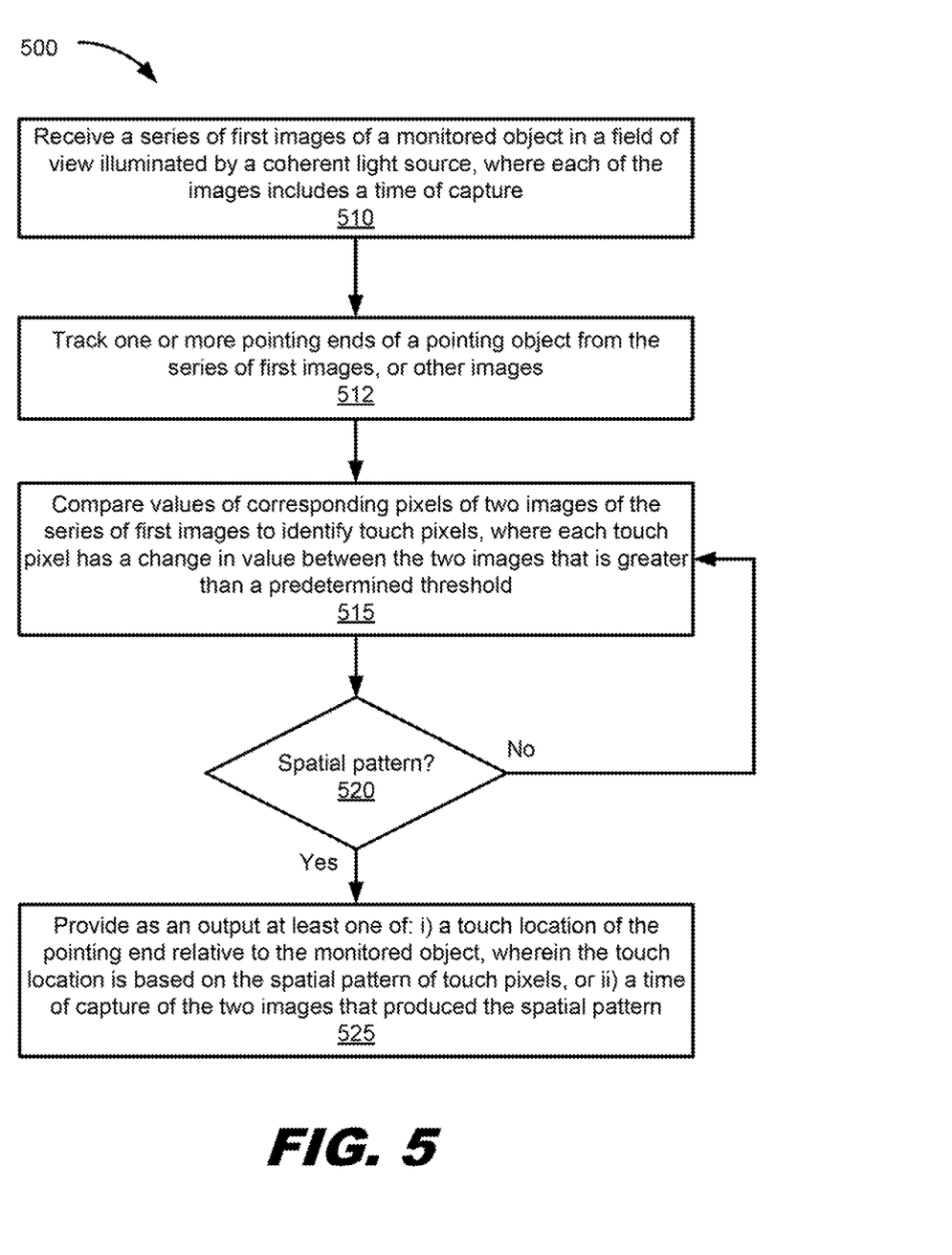
FIG. 5 depicts a flow diagram illustrating an example process of identifying speckle pattern change to determine a location or time of a detected touch.

FIG. 5 depicts a flow diagram illustrating an example process 500 of identifying speckle pattern change to determine a location or time of a detected touch. At block 510, the speckle change processing system receives a series of first images of a monitored object in a field of view illuminated by a coherent light source, where each of the images includes a time of capture. The images are captured by a sensor that is responsive to the wavelength of coherent light illuminating the monitored object.

At block 512, the system tracks one or more pointing ends of a pointing object from the series of images, or a different set of images. For example, the pointing end can be one or more fingers of a hand, which is the pointing object, or the pointing end can be the tip of a stylus pointing object. The pointing end(s) can be tracked by identifying the shape in the images and following the movement of the pointing end(s) in the series of images.

Then at block 515, the system compare values of corresponding pixels of two images of the series of first images to identify touch pixels. Touch pixels are pixels that change in value between the two images, and the change is greater than a threshold. For example, if pixel values can range from 0 to 255, a threshold for value changes can be set at 128. The locations of the pointing end(s) identified at block 512 can be used to pinpoint the regions where touch pixels may be present. That is, the regions in the images that are not near a pointing end do not yield a touch pixel because no touch will occur far from the pointing end(s). However, if the pointing end(s) are not tracked, the entire image can be searched for touch pixels.

Next, at decision block 520, the system determines whether a spatial pattern of touch pixels has been identified. The spatial pattern can correspond to a pointing end of a pointing object. For example, a semi-circular or circular spatial pattern can correspond to fingertip or stylus end. If a spatial pattern has not been identified (block 520—No), the process returns to block 515 to further compare images to identify touch pixels.

If a spatial pattern has been identified (block 520—Yes), at block 525, the system provides an output. The output includes at least one of: i) a touch location of the pointing end relative to the monitored object, where the touch location is based on the spatial pattern of touch pixels, or ii) a time of capture of the two images that produced the spatial pattern.

In the case of a touch location output, the touch location can be a location on the monitored object, for example, the location of a finger on a flat mat, as shown in the example of FIG. 4A. This technique replaces solutions that use a capacitive touch mat for detecting when contact has been made with the touch mat surface. With the present technique, a mat constructed to have a controllable speckle size change when touched may be useful for characterizing the force of the touch. In one implementation, the mat may be made of a flexible film on top of a rubber substrate to localize pressure deformations. However, any surface that is flexible to approximately half of the wavelength of the illuminating coherent light can be used.

In another example, the touch location can be the location on a three-dimensional object, such as a book, on which a multiple-choice question has been projected, with virtual buttons corresponding to the different answers. Based on the location of the user's touch relative to the projected answer choices on the book, the user's answer selection can be identified. Thus, the techniques described herein can be used to enable identification of three-dimensional touch on arbitrary objects.

A time of capture output may be useful when an unknown object made of an unknown material is being, monitored in the field of view of the speckle sensor, and the time when the object has been touched is of more value than the location where the object has been touched. For example, if the object is a mat on which the pages of a book have been projected, if the time of a touch anywhere on the projected book can be detected, the page can be virtually turned so that a projection of the next page is shown to the user. In this case, if the speckle sensor and/or the tracking sensor is positioned such that it is not possible to determine exactly where the touch occurred, then knowing the moment in time when a touch has occurred on the object is still useful.

Figure 6A:
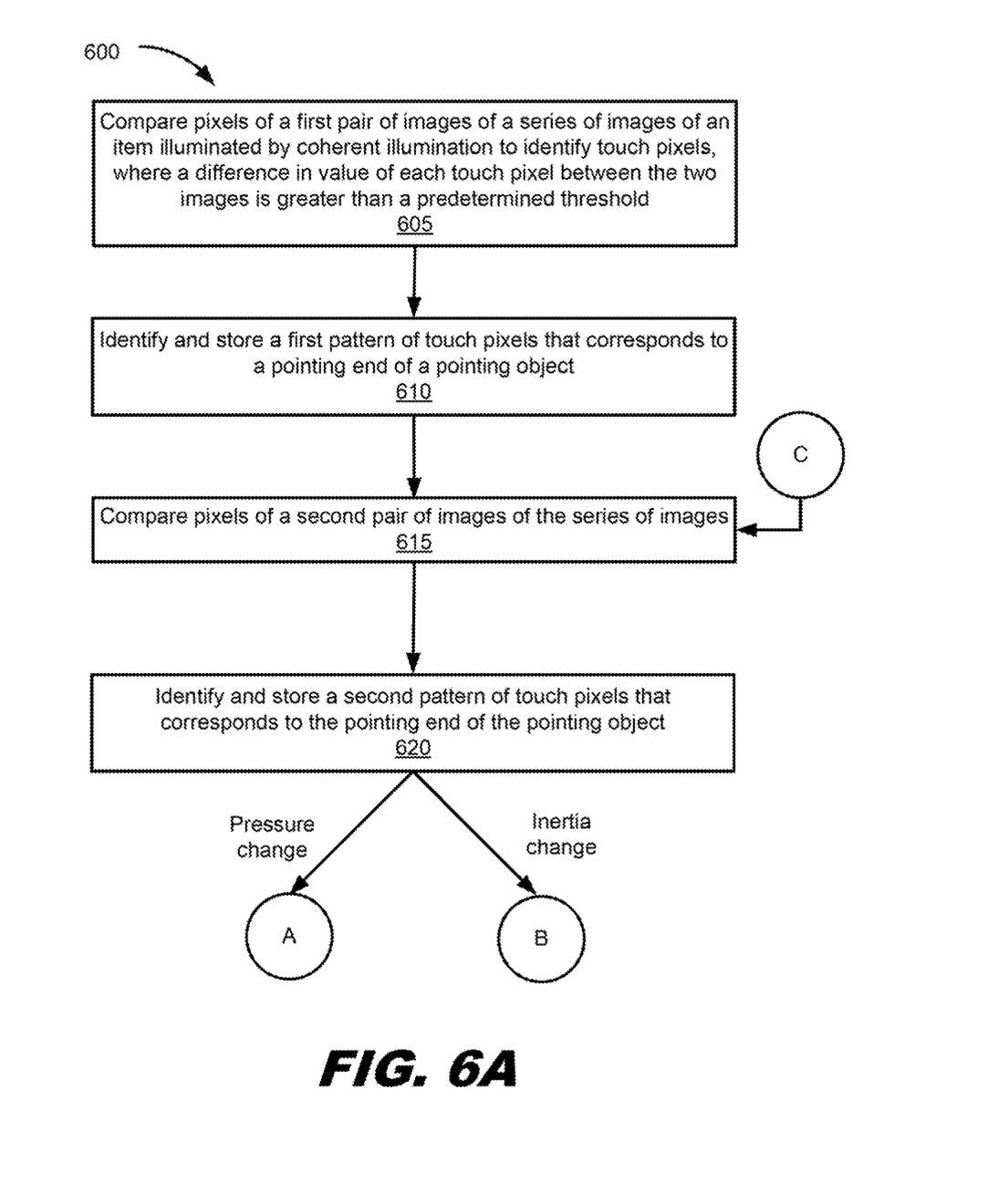
FIGS. 6A-6C depict a flow diagram illustrating an example process of identifying speckle pattern to change to determine a pressure change of a touch.
Figure 6B:
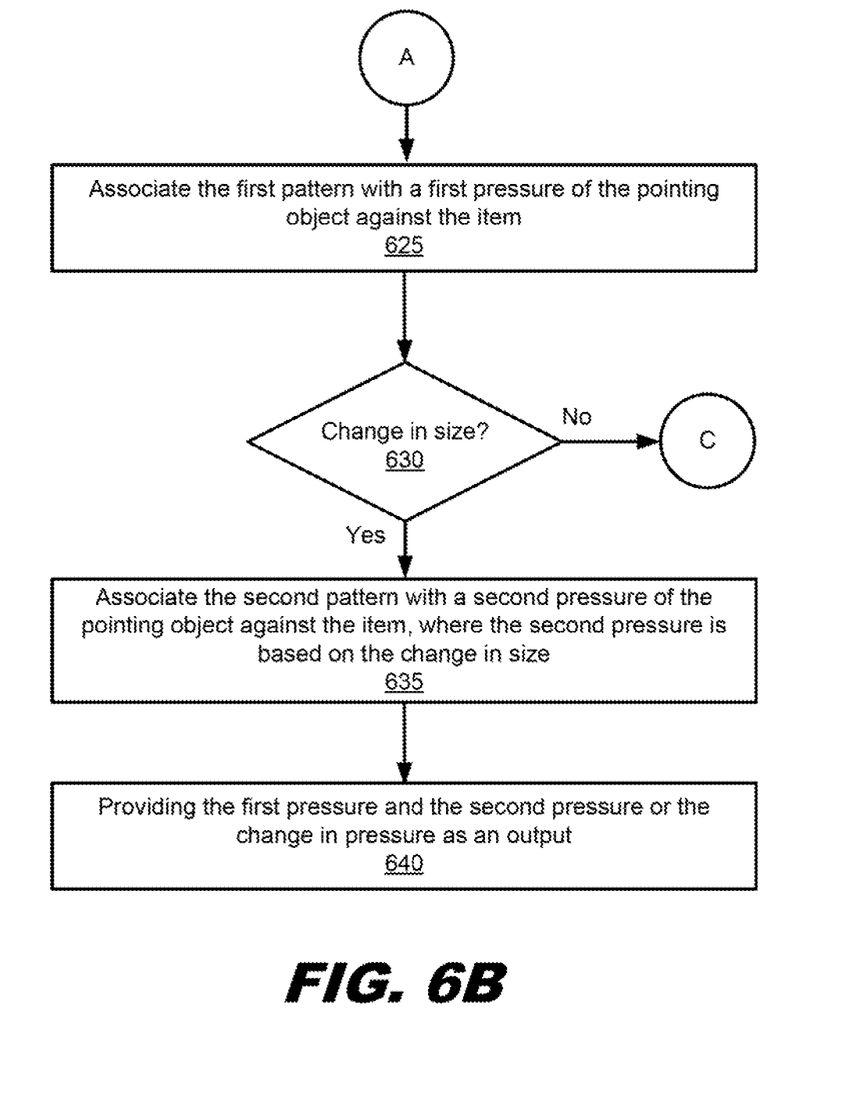
Figure 6C:
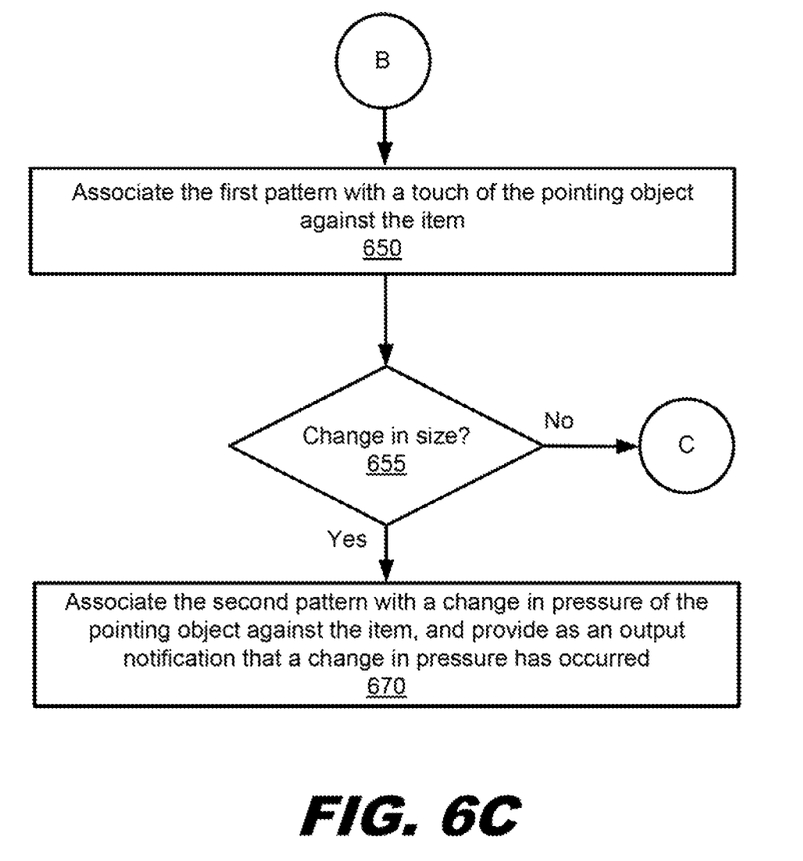

FIGS. 6A-6C depict a flow diagram illustrating an example process 600 of identifying speckle change pattern to determine a pressure change of a touch. At block 605, the speckle change processing system compares pixels of a first pair of images of a series of images of an item illuminated by coherent illumination to identify touch pixels, where a difference in value of each touch pixel between the two images is greater than a threshold. In some implementations, the capture time of the images are also available.

Next, at block 610, the system identifies and stores a first pattern of touch pixels that corresponds to a pointing end of a pointing object.

The system compares pixels of a second pair of images of the series of images at block 615. The second pair of images can include one of the images from the first pair of images, or be two different images that occur subsequent to the first pair of images in the series of images.

And at block 620, the system identifies and stores a second pattern of touch pixels that corresponds to the pointing end of the pointing object. The first pattern and second pattern can be, for example, a semi-circular or circular shape. The shape may even change slightly from the first pattern to the second pattern, due to noise or pressure from the pointing end being applied in a slightly different direction.

At this point in the process, the system can perform processing for identifying a pressure change or an inertia change. For the case of identifying a pressure change, at block 625, the system associates the first pattern with a first pressure of the pointing object against the item.

Then at decision block 630, the system determines whether there is a change in size of the second pattern from the first pattern. One method of determining a change in size is to identify a radius of the semi-circular or circular shape and determine if it has increased or decreased from the first pattern to the second pattern. If a change in size of the pattern is not detected (block 630—No), the process returns to block 615 for the comparison of pixels of a second pair of images.

If a change in size of the pattern is detected (block 630—Yes), at block 635, the system associates the second pattern with a second pressure of the pointing object against the item, where the second pressure is based on the change in size. Thus, if the second pattern is larger than the first pattern, the second pressure is considered to be greater than the first pressure. The magnitude of the pressure can be qualitative, so that an increase or decrease in pressure is known qualitatively, but the actual amount of applied pressure is not determined. Alternatively, if the pressure on a mat or other object has been calibrated, the size of the pressure pattern can be used to quantitatively determine the amount of applied pressure. Values of the first pressure and the second pressure or the change in pressure are provided as an output at block 640. The location and/or the time of the first and second pressure touches can also be provided.

Pressure changes can be used in a drawing application where a stylus is used as the pointing object. The line weight of the drawing made with the stylus is based on the applied pressure, that is, the harder the pressure, the thicker the lines. Pressure changes can also be used in a keyboard application where the volume of sound emitted from each key pushed by fingers on a keyboard is based on the applied pressure, that is, the harder the pressure, the louder the sound.

For the case of identifying a pressure change, at block 650, the system associates the first pattern with a first touch of the pointing object against the item.

Then at decision block 655, the system determines whether a change in size of the second pattern in subsequent images of the series of first images from the first pattern has been detected. If a change in size of the pattern is not detected (block 655—No), the process returns to block 615. If a change in size of the pattern is detected (block 655—Yes), at block 670, the system associates the second pattern with a change in pressure of the pointing object against the item and provides as an output a notification that a change in pressure occurred. The time of the change in pressure can also be provided.

Not all of the steps or features are used in all of the implementations of the presented techniques.

What is claimed is:

1. A system comprising:
   a first sensor to capture a plurality of first images of a portion of a first object illuminated by coherent illumination and a time of capture of each of the plurality of first images; and
   a hardware processor to:
   compare a first image having a first pattern to a second image having a second pattern;
   identify, via the comparison, a first touch point with a first pressure and a second touch point with a second pressure, wherein the first touch point corresponds to the first pattern and the second touch point corresponds to the second pattern and the first and the second touch points have a difference in pressure between the two images that is greater than a threshold;

determine a spatial shape formed by the first and the second touch points that corresponds to a pointing end of a pointing object, providing a time of capture of the first image and the second image that produced the spatial shape; and determine a touch location of the pointing end based on the time of capture provided by the pointing object and based on a change in the first pattern and the second pattern.

2. The system of claim 1, wherein the hardware processor is further to:

from the plurality of first images, track one or more pointing ends of the pointing object, wherein comparing the first image and the second image comprises comparing regions near the one or more pointing ends of the two images.

3. The system of claim 1, further comprising:

a tracking sensor to capture a plurality of tracking images of the portion of the first object, wherein the hardware processor is further to:

identify one or more pointing ends of the pointing object from the plurality of tracking images, wherein comparing the first image and the second image comprises comparing regions near the one or more pointing ends of the two images.

4. The system of claim 1, wherein the hardware processor is further to:

identify the first and the second touch points having the spatial shape corresponding to one or more pointing ends of the pointing object, wherein comparing the first image and the second image comprises comparing regions near the spatial shape of the two images.

5. The system of claim 1, wherein the hardware processor is further to:

associate the spatial shape with the first pressure of the pointing object against the first object;

upon determining a change in size of the spatial shape in subsequent images of the plurality of first images, associating the second pressure of the pointing object against the first object, wherein the second pressure is based on the change in size of the spatial shape; and providing as an output the first pressure and the second pressure.

6. The system of claim 1, further comprising:

a scanning mechanism to scan light from a light source generating the coherent illumination over the portion of the first object to illuminate the portion of the first object while capturing the plurality of first images.

7. The system of claim 1, further comprising:

optics to spread light from a light source generating the coherent illumination over the portion of the first object while capturing the plurality of first images.

8. A method comprising:

receiving, by a hardware processor, a series of first images that includes a monitored object illuminated by a coherent light source, wherein each of the first images includes a time of capture;

comparing, by the hardware processor, values of corresponding pixels of a first image having a first pattern to a second image having a second pattern of the series of first images to identify touch pixels, wherein each touch pixel changes in value between the first pattern and the second pattern, and the change is greater than a threshold; and identifying a spatial pattern of touch pixels for the first pattern and the second pattern that corresponds to a pointing end of a pointing object;

providing a touch location of the pointing end relative to the monitored object, wherein the touch location is based on the spatial pattern of touch pixels; and providing the time of capture of the two images that produced the spatial pattern.

9. The method of claim 8, further comprising:

tracking, by the hardware processor, one or more pointing ends of the pointing object from the series of first images, wherein comparing corresponding pixels comprises comparing corresponding pixels in a region around the identified one or more pointing ends.

10. The method of claim 8, further comprising:

receiving, by the hardware processor, a series of second images; and tracking, by the hardware processor, one or more pointing ends of the pointing object from the series of second images, wherein comparing corresponding pixels comprises comparing corresponding pixels in a region around the identified one or more pointing ends.

11. The method of claim 8, further comprising:

illuminating the monitored object by scanning light from the coherent light source over the monitored object.

12. The method of claim 8, further comprising:

spreading, by the hardware processor, light from the coherent light source to illuminate the monitored object in a field of view of a sensor while capturing the series of first images with the sensor.

13. A non-transitory computer readable medium storing instructions causing a hardware processor to:

compare pixels of a first pair of images including a first image having a first pattern to a second image having a second pattern of a series of images of an item illuminated by coherent illumination to identify touch pixels of the first image and the second image, wherein a difference in value of the first pattern and the second pattern is greater than a threshold;

identify and store a first pair pattern of touch pixels that corresponds to a pointing end of a pointing object;

determine a touch location of the pointing end based on a time of capture provided by the pointing object and based on the difference in value of the first pattern and the second pattern;

compare pixels of a second pair of images of the series of images;

determine another touch location of the pointing end based on another time of capture provided by the pointing object and based on the difference in value of a third pattern and a fourth pattern; and identify and store a second pair pattern of touch pixels that corresponds to the pointing end of the pointing object.

14. The non-transitory computer readable medium of claim 13, wherein the stored instructions further cause the hardware processor to:

associate the first pair pattern with a first pressure of the pointing object against the item;

upon determining a change in size of the second pair pattern from the first pair pattern, associate the second pair pattern with a second pressure of the pointing object against the item, wherein the second pressure is based on the change in size; and providing i) the first pressure and the second pressure, or ii) a qualitative difference between the first pressure and the second pressure.

15. The non-transitory computer readable medium of claim 13, wherein the stored instructions further cause the hardware processor to:
- associate the first pair pattern with a touch of the pointing object against the item; and
- upon determining a change in size of the second pair pattern in subsequent images of the series of images from the first pair pattern, wherein the change is greater than a given change, associate the second pattern with a change in pressure of the pointing object against the item, and provide a notification that a change in pressure has occurred.

\* \* \* \* \*